United States Patent [19]

Fein et al.

[11] 4,206,422
[45] Jun. 3, 1980

[54] GAS LASER

[75] Inventors: Michael E. Fein, Toledo; Charles W. Salisbury, Risingsun, both of Ohio

[73] Assignee: Owens-Illinois, Inc., Toledo, Ohio

[21] Appl. No.: 523,609

[22] Filed: Nov. 13, 1974

[51] Int. Cl.² .................................................. H01S 3/02
[52] U.S. Cl. ................................................ 331/94.5 D
[58] Field of Search ........................................ 331/94.5

[56] References Cited
U.S. PATENT DOCUMENTS

| 3,719,900 | 3/1973 | Hochuli | 331/94.5 D |
| 3,930,731 | 1/1976 | Andringa | 356/350 |

*Primary Examiner*—William L. Sikes
*Attorney, Agent, or Firm*—Richard D. Heberling

[57] ABSTRACT

There is disclosed a gaseous laser device comprising an envelope, a cathode, a lasing gaseous volume, and an anode, the envelope being comprised of at least two opposing substrates bonded together; the cathode, lasing gaseous volume, and anode being positioned within different cavities of at least one substrate such that the cathode, lasing gaseous volume, and anode are commonly confined within the envelope in an integrally connecting relationship.

2 Claims, 4 Drawing Figures

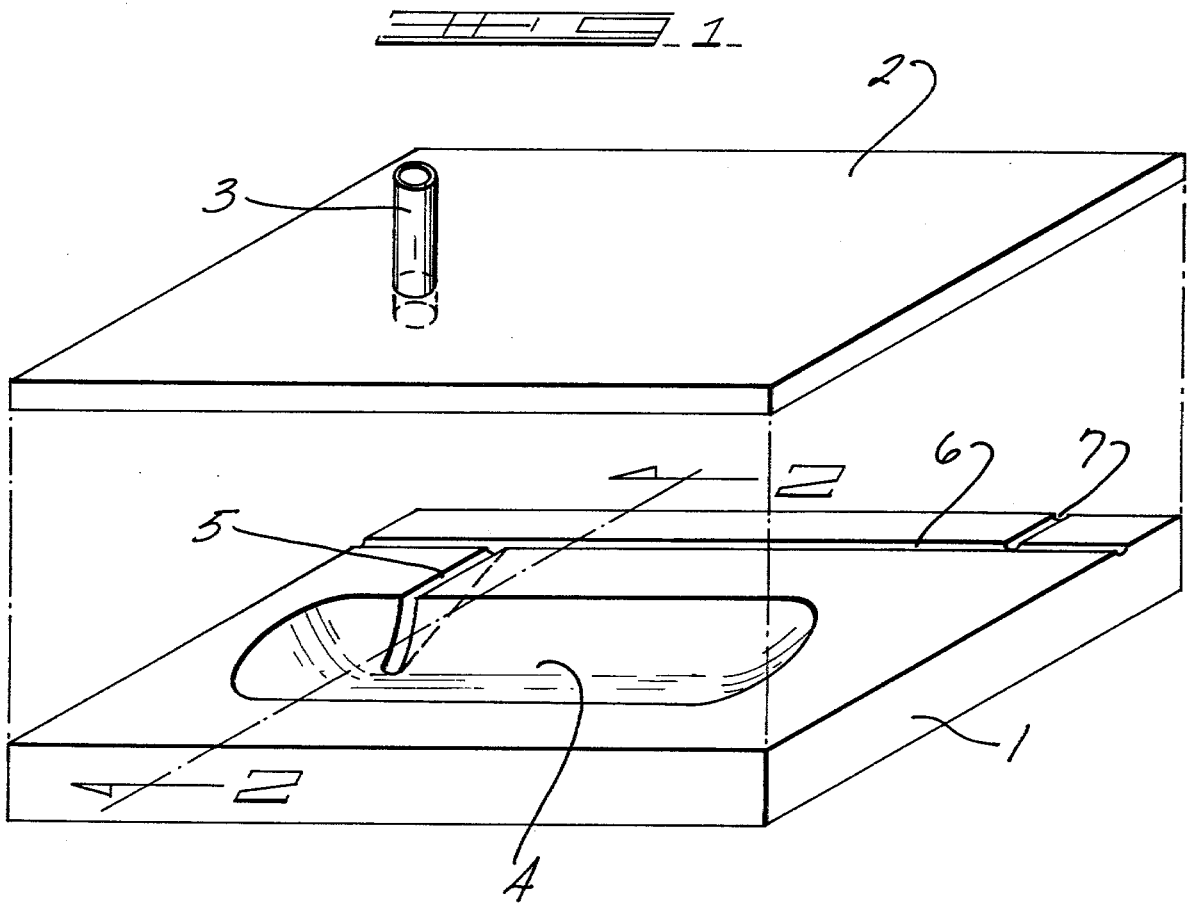
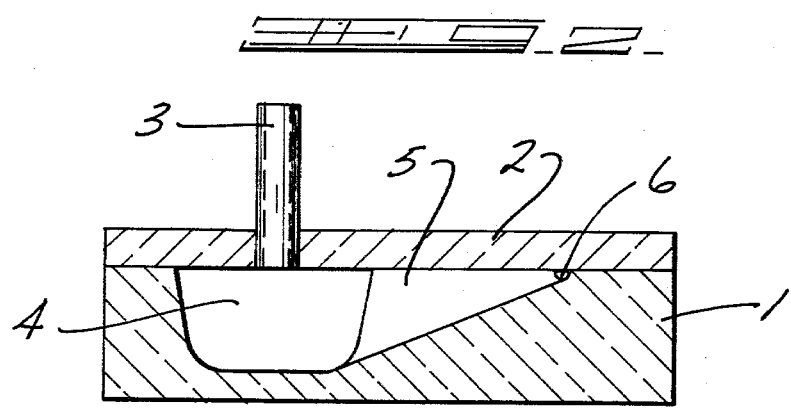

GAS LASER

This invention relates to gas lasers. More particularly, it relates to special geometric configurations of gas lasers (especially laser envelopes) which are inexpensive to manufacture and assemble. This invention also relates to methods of manufacture, assembly, fabrication, and processing of such laser devices, including laser systems incorporating such devices.

Gas lasers are widely known in the prior art. Reference is made to U.S. Pat. No. 3,628,175, issued to J. D. Rigden and U.S. Pat. No. 3,149,290, issued to W. R. Bennett, Jr. and Ali Javan. See also Douglas C. Sinclair and W. Earl Bell, *Gas Laser Technology*, Holt, Rinehart, and Wilson, c. 1969.

Typically, a gas laser comprises an elongated hollow body containing a suitable gas and two laser mirrors positioned at opposing ends of the body. Pump energy is appropriately introduced into the gas, causing a population inversion to exist therein. The existence of this inversion between laser mirrors of adequate reflectivity causes laser oscillation to develop in the gas. Alternatively, where the laser is used as an amplifier, the gas-filled body may simply be terminated by windows transparent to the wavelength to be amplified.

Many different sources of pump energy have been shown to be suitable for the initiation of laser action in gas lasers and are well known to those skilled in the art.

One important method of providing pump energy is to initiate an a.c. (alternating current) or d.c. (direct current) gas discharge in the laser gas. Another method is to illuminate the laser gas volume with electromagnetic radiation of a suitable wavelength, such as radio frequency waves, visible light, or gamma radiation. Yet another method is to initiate a suitable chemical reaction in the laser gas. Additional pumping methods are known to those skilled in the art. Most of the embodiments set forth in this disclosure will refer specifically to a gas laser embodiment in which a direct current electrical discharge is maintained in the laser gas. However, the component configurations and manufacturing methods described throughout this specification can be suitably used with a wide variety of pumping techniques, and the use of such alternative techniques is contemplated in the practice of this invention.

A wide variety of gases may be used in gas laser construction. For example, successful gas lasers have been made with the gaseous forms of at least the following materials, separately or in mixture combination: helium, neon, argon, krypton, xenon, oxygen, mercury, cadmium, carbon dioxide, carbon monoxide, water, sodium, potassium, cesium, copper, gold, calcium, strontium, thallium, carbon, silicon, tin, lead, nitrogen, sulfur, tellurium, fluorine, chlorine, iodine, manganese, zinc, boron, indium, germanium, phosphorus, arsenic, antimony, bismuth, selenium, CN, HBr, DBr, HCl, DCl, HF, DF, HD, $D_2,H_2$, NO, $CS_2$, HCN, DCN, $D_2O$, $H_2S$, $N_2O$, OCS, $SO_2$, $CH_3F$, $CH_3OH$, $H_2C:CHCl$, and $NH_3$.

One preferred gas mixture for certain applications is helium-neon, the typical composition being about 75 to 95 percent atoms of helium and 25 to 5 percent atoms of neon. One specifically contemplated composition is 87.5% atoms of helium and 12.5% atoms of neon, at a pressure of about 3 Torr.

The laser mirrors define the ends of the optically active gas volume. Laser mirrors are generally required to have very precise surface figures, typically perfect to within about 0.1 wavelength of visible light. Multiple dielectric coatings are typically provided on mirror surfaces, so as to provide very high reflectivity, generally 98.5% to 99.9% for helium-neon lasers, while permitting a small fraction of incident radiation to be transmitted with little loss. The technology of laser mirror production is widely known, and such mirrors are commercially available from many manufacturers, such as Spectra-Physics, of Mountain View, California. It is contemplated in the practice of this invention to utilize any suitable laser mirrors, with such parameters as reflectivity and radius of curvature to be determined by the nature of the laser gas and by the requirements of the specific application.

The laser mirrors must generally be precisely aligned with respect to one another and with respect to the axis of the laser bore. Typically, a perpendicular to the mirror surface at the laser bore axis must be aligned within a fraction of an arc minute of that axis. Techniques of mounting and aligning mirrors to this tolerance are well known in the art. Although there may be particular mirror mounting and alignment techniques which are unusually well-adapted to the class of laser constructions described herein, it will generally be possible to adapt to this present class of lasers any mounting or alignment technique that has been used with prior-art tubular glass lasers.

The ends of the volume filled with laser gas may be terminated directly by the laser mirrors (the so-called "internal-mirror" laser), or may be terminated by vacuum-sealed optical windows, generally mounted at Brewster's angle, with the mirrors located outside the windows (the "external-mirror" laser). It is also possible to construct a laser in which one end is mirror-terminated and the other is window-terminated.

Although most of the examples given in this disclosure are stated in terms of just one of these three forms, it should be understood throughout that in almost every case any of the three would be possible and potentially useful variant.

An important element of the construction of a gas laser tube is the method and materials used to seal or attach, to the glass or metal structure of the tube, the mirrors or Brewster windows which define the ends of the optically active discharge volume. This is typically done by means of epoxy resins. The critical requirements for the seal are:

1. It should be impervious to contaminating material such as water vapor from the outside environment;

2. It should be suitable to the processing environment, such as high temperature;

3. It should not emit a significant density of contaminating materials;

4. It should constitute a seal of adequate mechanical durability.

A material commonly used to attach laser mirrors is Varian Torr-Seal$^{TM}$ epoxy resin, which is applied as a thin bead around the edge of the part to be sealed. Other sealing methods and materials are known to those skilled in the art. Although certain of these methods may be particularly suitable to the class of lasers contemplated in this invention, most known mirror-sealing methods will be readily adaptable to work with these lasers.

The procedures used for manufacturing the laser device should be adequate to remove all significant impurities. These procedures typically include evacuation, possibly at an elevated temperature, and the operation of a series of cleaning gas discharges in repeated fillings of gas.

Where d.c. gas-discharge lasers are to be constructed, a cathode and an anode will be required.

Cold cathodes are typically constructed out of aluminum, magnesium, zirconium, or alloys thereof. The cathode must be prepared so as to retard sputtering. The production of a thin sputter-resistant oxide layer over the electrode may be accomplished by operating a discharge in oxygen between the cathode and an auxiliary anode as described, for example, in Section 7-3 of *Gas Laser Technology*, by Douglas C. Sinclair and W. Earl Bell (Holt, Rinehart, and Winston, Inc., 1969). Various other sorts of cold cathodes, such as the multi-carbonate cathodes used in neon signs, can also be used. In one embodiment hereof, hot cathodes are used in gas lasers constructed in accordance with this invention. Hot cathodes for use in lasers are, like cold cathodes, well known in the art.

Cold cathode configurations are typically hollow. The hollow configuration is used because it tends to retard the ill effects of sputtering and resulting gas clean up, and because it produces a compact structure.

The anode may be of any suitable conductive material which can withstand the cleaning procedures normally used in high vacuum technology.

It is common practice, in the prior-art technology specific to helium-neon laser manufacture, to manufacture the laser cathode from a piece of aluminum tubing. There are several consequential costs in laser manufacture using such a cathode. First of all, commonly available aluminum tubing has been made by an extrusion process which leaves the surface layer fouled with materials such as lubricating oil. Steps are required to remove the impure surface. One example of a suitable procedure for removing the surface layer is machining of a fresh surface using water as a lubricant instead of cutting oil; reference is made to U. Hochuli, et al., "Cold Cathodes for He-Ne Gas Lasers", IEEE J. Quantum Electronics QE-3, 612–614 (Nov. 1967).

A second cost of using an aluminum tubular cathode is that somewhat cumbersome means must be provided to support mechanically the cathode and to connect it electrically to the atmosphere outside the laser envelope. For example, in U.S. Pat. No. 3,739,297, the electrical connection and mechanical support means include a pin which must be heat-sealed through a glass section, with spring clips, welded wires, and other connecting means providing electrical connections between the pin and the cathode.

The envelope of a gas laser is normally constructed out of glass such as a borosilicate, e.g., Kimble KG-33. However, many other glasses may be used so long as the thermal expansion coefficient is suitable for normal manufacturing procedures and so long as the glass material itself does not contribute undesirable amounts of impurities to the gas discharge. Other materials, such as metals, plastics, ceramics, glass-ceramics, and so forth may also be utilized. Plastics and other materials having high vapor pressure have generally been used only in flowing-gas lasers, which tend to be less sensitive to impurities than are sealed-off lasers because the constant gas replenishment in a flowing-gas laser reduces impurity levels.

Throughout this disclosure frequent reference is made to the use of glass as the basic material. It is important to understand that the methods and device configurations described are in almost every case adaptable for use with machined or pressed ceramics, molded plastic, or any other insulating material, with appropriate alterations in choices of sealants, thermal processing, and the like. The nature of the necessary modifications will be apparent to those skilled in the art.

A common method of laser envelope construction has been the flame-working of tubular glass components. An example of such a laser is the "single bore tube gas laser" described in U.S. Pat. No. 3,739,297. Tubular glass has the advantage of being a relatively inexpensive material, of being conveniently worked into a variety of configurations, and of being a relatively convenient material for the formation of gas-tight seals. One disadvantage of tubular glass structures is that such devices are more expensive than might be hoped when they are manufactured in large volume.

Many of the tubular glass laser device shapes which are commonly made by manual flame working would be quite expensive or impossible to manufacture with conventional high-volume glass-working machinery. An example of such a shape is the common "side-arm" laser construction, in which cathode and anode are placed in extension tubes or bulbs joined at the side of the laser capillary. A sidearm laser construction of this common sort is illustrated in FIG. 1—1 of *Gas Laser Technology*, supra.

Even the co-axial shapes which are more readily assembled on high-volume machinery (and which also have the advantage to users of being compact in construction) will tend to be somewhat costly because of the need to produce several vacuum-tight seals with relatively low strain and the requirement of assembling three, four or more tubular components with excellent coaxial alignment. Also the laser capillary tube must retain a high degree of straightness during all the heating and cooling operations which are implicit in manufacture.

In another known method of laser construction, a laser bore and channels connecting thereto are drilled into a block of fused quartz or other insulating material and separately-manufactured electrode envelopes are joined to the connecting channels. Such a laser is illustrated in H. G. van Bueren, et al, "A small and stable continuous gas laser", Physics Letters 2, 340–341 (Nov. 1, 1962). The expense of drilling holes in glass materials may be uneconomical, especially when the depth of each hole must be long in relation to its diameter. Likewise, large scale production may not be feasible.

Most laser applications have involved the use of relatively small numbers of lasers. However, there have been recent advances in the art calling for relatively large numbers of lasers. One example of such an application is the video long-play record, or VLP, which is likely to require a low-power helium-neon laser attached to a large fraction of all television sets sold. Another such application is the laser-equipped point-of-sale scanner; which provides for automatic reading, by a scanned laser beam, of identifying tags on supermarket merchandise.

With these high-volume applications actually imminent, there comes to be a premium on the development of high-volume, low-cost lasers including manufacturing techniques.

In accordance with this invention, there is provided a novel gas laser and high production manufacturing process which avoid many of the costs associated with tubular glass laser technology, tubular metal cathodes, and related low production processes.

More especially, this invention relates to a gaseous laser device comprising an envelope, a cathode, a lasing gaseous volume, and an anode, the envelope being defined by at least two opposing substrates bonded together, the cathode, lasing gaseous volume, and anode being positioned within different cavities of at least one substrate such that the cathode, lasing gaseous volume, and anode are commonly confined within the envelope in an integrally connecting relationship.

In setting forth our invention, it will be useful at times to describe the gas laser not in terms of the solid physical components which make it up, but rather in terms of the volumes of space, which may be occupied by gas, vacuum, or inserted objects, that are bounded by the surfaces of the physical components of the laser envelope. There are usually several connected constituent volumes in a gas laser, each of which has one or more well-defined functions. For example, a common d.c. glow discharge laser envelope, such as that depicted in FIG. 1—1 of *Gas Laser Technology*, may be thought of as having five constituent volumes; a cathode volume, whose function is to contain the cathode electrode and the portions of the glow discharge which attach to the cathode (e.g., the negative glow and the Faraday dark space), a cathode-connecting volume whose function is to conduct the discharge from the cathode volume to the laser bore, a laser bore (defined in this case by the inner surface of a piece of capillary tubing) whose function is to contain the positive column in which laser action occurs, an anode connecting volume, and an anode volume to contain the anode electrode and the discharge segments attached thereto (e.g., the anode fall if one is present).

Other types of gas lasers may have different constituent volumes, but in most cases it will be true that several recognizable different spatial volumes enter into the laser's construction, each of these volumes having particular operational functions. In accordance with the practice of this invention, there are provided manufacturing methods which make possible the economical manufacture of a plurality of a gas laser's constituent volumes, by manufacturing some or all of the boundaries of this plurality of volumes in a single piece of material.

It should be understood that by constituent volumes, we do not necessarily mean spaces all of whose boundaries are defined by solid walls. For example, in the device shown in FIG. 1—1 of *Gas Laser Technology*, supra, the cathode volume is open at the point where the cathode connecting tube joins the cathode bulb. Nevertheless, it is clear to one skilled in the art that the space enclosed by the cathode bulb (and closed by an imaginary plane across the end of that bulb where the connecting tube enters) is a recognizably separate region of the laser device, having well-defined functions. It is not always a matter of universal agreement how best to conceptually divide a given laser device into constituent volumes. For example, for some purposes it might be convenient to consider the cathode volume and the cathode-connecting volume as a single unit. Nevertheless, it will be understood by those skilled in the art that most gas lasers have several recognizably-distinct constituent volumes.

Although most of the embodiments herein are stated in terms of positive-column glow-discharge, helium-neon lasers, which typically have cathode volumes, laser bore volumes, anode volumes, and one or more connecting volumes, many other varieties of lasers are contemplated to be within the scope of the invention, such lasers requiring other constituent volumes well known to those skilled in the art. For example, metal vapor lasers may include metal-storage and condensation volumes. Lasers unusually subject to gas cleanup may include gas reservoir volumes. Lasers subject to serious cataphoretic effects may include return path volumes (analogous to that illustrated in U.S. Pat. No. 3,628,176). Getter-containing volumes might be incorporated in many different varieties of gas lasers, in order to increase resistance to contamination during long-term operation, or to reduce the purity requirements placed on the gas-filling station used in laser manufacture. Coolant-flow volumes may be provided in lasers which require the removal of excess heat.

Volumes may be provided for the insertion of optical elements, such as prisms, Brewster windows, intensity or phase modulators, gratings, apertures, lenses, detectors, etalons, beam splitters, or other mirrors additional to the two normally required in the operation of a laser.

When we refer to the envelope of a laser, we mean the gas-tight wall which defines the periphery of the constituent volumes of the laser. In the practice of this invention, the envelope consists of at least two opposing electrically-insulating components which are sealed, fused, or otherwise bonded together to form a gas-tight structure. However, in some embodiments, the envelope is considered not to include the mirrors or windows which define the ends of the laser bore, these end terminations having to be bonded to the envelope to complete a truly gas-tight structure. Likewise, electrical feed-throughs which conduct electric current from the inside to the outside of the envelope are generally considered not to be a part of the envelope, but rather to be separate components which pass through the envelope in gas-tight fashion.

In this invention, several basic structural embodiments, each of which is particularly suitable to high-volume manufacture, are contemplated. In one embodiment, one or more constituent volumes of the laser are incised, pressed, molded, machined, ground, or otherwise defined in a single surface of a substrate. These volumes are then closed by sealing a second, flat, substrate to the incised substrate.

In a further embodiment, all or a plurality of constituent volumes of the laser are defined by the combination of depressions in the mating faces of two component substrates, neither of the mating surfaces being entirely flat. In this variation, it may be that neither of the substrates has any planar surface.

Another embodiment may be described as the "multiple-plate laser". Top and bottom surfaces of all or a plurality of this laser's constituent volumes are defined by essentially-planar surfaces of top and bottom plates. The side surfaces of these volumes are defined by one or a multiplicity of plates essentially of equal thickness, which are sealed between the top and bottom plates.

Many obvious improvements to these three approaches are possible, and more than one of them may be employed in a single device. Some of the possible variations will be suggested in this disclosure, and others will be apparent to those skilled in the art.

Reference is made to FIGS. 1 to 4 illustrating some of the best embodiments contemplated by the inventors in the practice of this invention.

In FIG. 1, there is illustrated an exploded, perspective view of a two-part laser prepared in accordance with this invention.

FIG. 2 is a cross-sectional view of FIG. 1.

Figure 3:
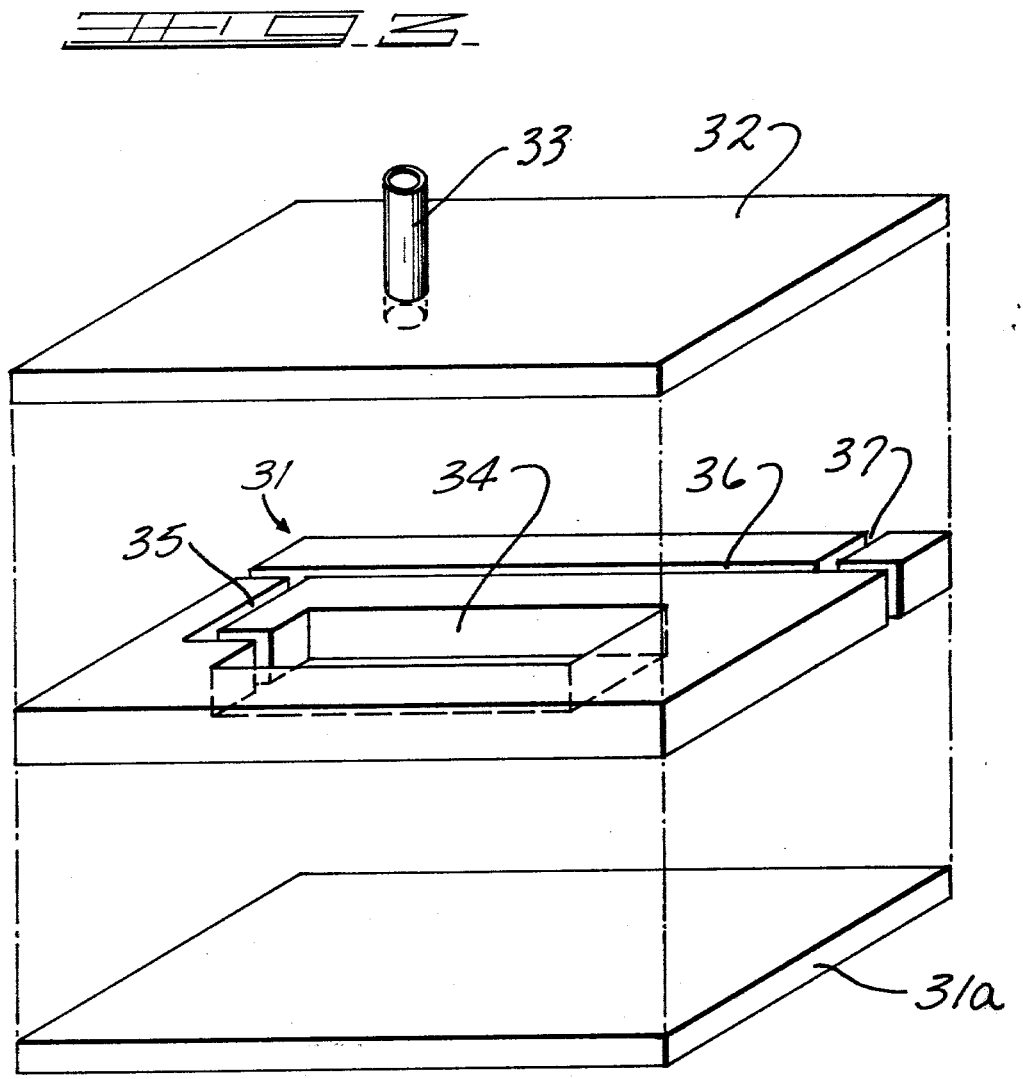
FIG. 3 is an exploded, perspective view of a three-part laser prepared in accordance with this invention.

In FIG. 1, there is illustrated a substrate 1 and a cover plate 2. The cover plate 2 contains a gas processing tubulation 3. Substrate 1 contains a cathode volume 4, a connecting channel 5, a laser bore or groove 6, and an anode channel 7.

Although the gas processing tubulation 3 is shown as connecting with the cathode volume 4, it will be understood by those skilled in the art that this gas processing tubulation may be conveniently positioned anywhere in the device so as to introduce gas into the cathode volume, connecting channel, and the laser bore.

Although not shown in FIG. 1, it will be understood by those skilled in the art that a cathode will be introduced into the cathode volume area 4. Likewise, an anode will be conveniently inserted and sealed, vacuum-tight, into the anode channel 7.

In FIG. 2 there is illustrated a cross-sectional view of the entire assembled device of FIG. 1.

In FIG. 3 there is illustrated a modification of the embodiment of FIG. 1. There is shown a top cover plate 32, a center plate 31, and a bottom cover plate 31a. The top cover plate 32 contains a gas processing tubulation 33. The center plate 31 may be made up of one or more segments. It comprises a cathode volume 34, a connecting channel 35, a laser bore 36, and an anode channel 37.

The cathodes and anodes are not illustrated in any of the FIGS. 1, 2 and 3. However, it will be clearly understood by those skilled in the art that cathodes and anodes of various geometric shapes may be conveniently inserted into these devices. For example, a cathode would be inserted into the cathode volume 34 in FIG. 3 and an anode would be inserted into the anode channel 37 in FIG. 3. In actual practice the cathode typically may be in the shape of the walls of the cathode volume 34.

The laser termination LT shown diagrammatically in FIG. 3 can be any of the laser terminations described earlier herein, aligned and joined to the envelope at one end of laser bore 36; similar laser termination (not shown) is at the opposite end of laser bore 36.

Figure 4:
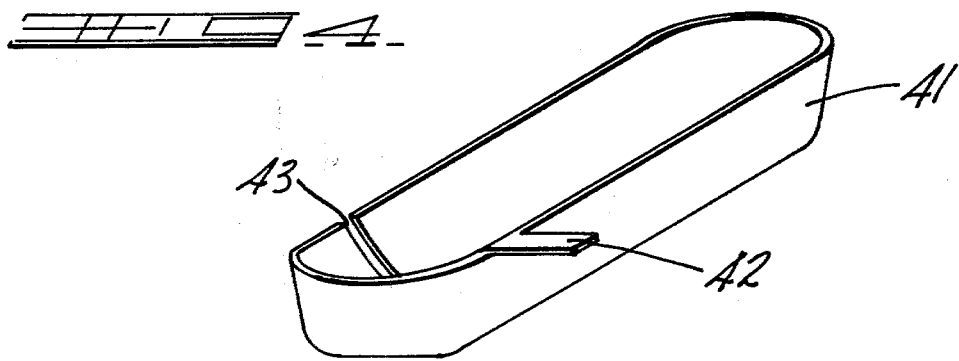
FIG. 4 is a perspective view of a cathode structure embodiment.

In FIG. 4 there is illustrated a cathode body 41 which would generally conform to the wall shape of the cathode volume 4 in FIG. 1. The cathode 41 contains a metal spade 42 which acts as a contacting tab for connection to an outside source of electrical power. There is also illustrated an entrance hole 43 opening into a connecting channel such as illustrated in FIGS. 1, 2 and 3.

One advantage of the set of geometrics contemplated in this invention is that the internal surfaces of the constituent volumes of the laser are all laid open, which facilitates cleaning during manufacture, using a variety of cleaning processes such as plasma cleaning.

Another advantage of the laying-open of internal surfaces inherent in this invention is that it facilitates coating by a variety of processes, such as vacuum evaporation, sputtering, chemical vapor deposition, ion plating, and settling from solution.

One useful application of coatings is the manufacture of laser cathodes by placing an adherent coating of conductive material on the walls of the cathode volume of the laser device. An anode electrode may be similarly manufactured.

It should, of course, be understood that the laser envelopes of this invention may be so constructed as to accept conventional electrodes, such as a metal pin anode or a hollow-tube cathode. A cathode of this general type is illustrated in FIG. 4. It is one important feature of this invention, however, that the laser envelopes described may easily be constructed so as to accept coated electrodes, a feature not shared by conventional tubular glass laser envelopes. To produce the cathode and anode electrodes, for example, a vacuum evaporation system may be used to coat the upper and lower laser substrates, through a mask, with several hundred Å of chrome (to act as an adhesion laser), followed by approximately 10,000 Å of aluminum. The mask restricts deposition to the regions which upon closure of the device would be the cathode and anode volumes.

It should also be noted that "thick-film" coatings may readily be applied to the surfaces of laser components prepared in accordance with this invention. These are typically coatings of conductive or insulating material which are applied in slurry form, by such processes as screen printing, settling, or spraying, and then heat-processed to remove solvents and solidify the material. Thick-film coatings have previously been employed in gas lasers. See, for example, K. G. Hernguist, "Low-radiation-noise He-Ne laser", RCA Review, Sep. 1969, pp. 429ff, in which a porous alumina lining, saturated with potassium is used to form a conductive cathode surface.

The unique feature of a thick-film coating, as used in a device made according to this invention, is that the openness and accessibility of our structure would make the application of coatings especially straightforward and economical.

An advantage of the open, easily coated structures contemplated in this invention is that passivating coatings may be easily applied to all interior surfaces. For example, it would be possible to evaporate several thousand Å of alumina or silica onto all interior surfaces of the device shown in FIG. 1 prior to the application of metal layers, so as to prevent diffusion of impurities harmful to laser action out of the glass substrates.

The use of interior coatings on laser bores has been disclosed in the prior art, for example in U.S. Pat. No. 3,394,320 to G. K. Medicus. What has not been disclosed is the application of such coatings by methods such as electron-beam evaporation, which requires a clear line of sight from a source, or the application of a passivating coating to all or some interior surfaces of a laser for the purpose of preventing emission of harmful impurities from those surfaces.

The use of such passivating layers makes it possible to consider using materials such as injection-moldable plastics to fabricate lasers, even though the relatively high vapor pressures of such materials might make them unsuitable for use without such passivating layers except in particular types of lasers such as flowing-gas lasers. If a passivating layer is constructed (perhaps in several sub-layers, including two or more different materials) to have adequately low porosity under all conditions which the laser will experience, then the substrate material will not in any way interact with the gas discharge, and any substrate material may be used whose thermal, mechanical, and electrical-insulating properties are found suitable. In fact, the substrate material might be a conductor, such as invar or aluminum, so long as adequate protective insulating layers were provided at all points to avoid the shorting-out of the gas discharge by the substrate material. An aluminum substrate heavily anodized on all surfaces might thus be suitable.

Two particular advantages of using an organic thermoplastic material to make laser envelopes are that:

1. Final alignment of the laser mirrors might be achieved by heating the plastic until it softened slightly, deforming the entire device or a part of it to obtain mirror alignment, and then permitting the plastic material to cool. A comparable method of alignment has been used with glass laser envelopes, but the high softening temperature of glasses makes this approach difficult with glass.
2. The several components of a thermoplastic laser envelope could conveniently be heat-welded to produce gas-tight bonds, thus eliminating the need for a separate sealant material.

Another example of the use of interior coatings in a laser envelope made according to our invention is the production of conductive inserts in the laser bore to increase laser power. See, for example, Yu. G. Zakharenko and V. E. Privalov, "Oscillations in the discharge gap of He-Ne laser and their effect on the emission parameters", Opt. Spectrosc. 35, 434 ff (Oct. 1973). Zakharenko and Privalov demonstrate that the use of metal rings, spaced within the positive column of a He-Ne laser, can increase output power. Our open structure would make it very economical and straightforward to provide such inserts, either by coating the walls of the bore or by dropping in separate metal tubes before sealing on the top plate. If it were desired to provide electrical contact to these rings, external connections would be manufactured by techniques such as those disclosed hereinbefore for anode and cathode connections.

Yet another possible example of the utility of interior coatings arises in the manufacture of high-current rare gas ion lasers. A common difficulty in the manufacture of such lasers is that the laser bore is rapidly eroded by the arc discharge. See, for example, William Bridges, "Materials and Techniques for Gas Lasers", Proc. 9th IEEE Conf. on Tube Techniques, 1968, pp. 117 ff. If the bore of such a laser were laid open, in a construction according to this invention, it could be straightforward to apply a very durable internal coating by a process such as flame spraying or plasma spraying. The substrates to be coated could be selected for such properties as high thermal conductivity, while the coating could be selected simply on the basis of its providing maximal resistance to erosion by the arc.

Another advantage of the class of laser envelopes contemplated in this invention is that the flexibility and precision of laser bore manufacture can be considerably enhanced. For example, in the conventional tubular gaseous laser, in which the laser bore is a section of capillary tubing, it becomes relatively expensive to make bores much smaller than 0.040 inch in diameter, or more precisely controlled in diameter than ±0.010 inch because of the difficulties involved in accurate control of the drawing process. In contrast, if the bore is manufactured by machining the surface of a glass plate, for example with a tungsten carbide or diamond grinding wheel of thickness slightly less than the desired bore width, it becomes straightforward to make bores at least a factor of two smaller than 0.040 inch in greatest dimension, and to control bore dimension to ±0.001 inch or better.

One particular application of this advantage will lie in the manufacture of unusually short helium-neon lasers of relatively high power. Since the gain of these lasers is known to be inversely related to diameter, the availability of smaller diameters will make it possible to approximately match the output powers of contemporary devices, but with a laser of shorter length.

A second application of the advantage will lie in precise control of transverse lasing modes. It is common practice to restrict lasers to desired modes of operation, e.g. $TEM_{00}$, by controlling the size of the optically limiting aperture in the laser cavity. In many cases, this aperture is the bore itself. The availability of economical methods for precise control of bore diameter will make more economical the precise control of transverse laser modes.

We claim:

1. As an article of manufacture a gaseous laser device comprising an envelope, a cathode, a lasing gaseous volume, spaced laser end pieces bounding said lasing gaseous volume, and an anode and means for making electrical connections to said anode and cathode, improvement in said envelope wherein said envelope is comprised of at least two opposing substrates, each having a flat mating surface, said flat mating surface being coextensive and bonded together, a plurality of interconnected cavities, including a connecting channel between said cathode cavity and said lasing gaseous volume, formed in the opposing surfaces of said substrate, the cathode, lasing gaseous volume, and anode being positioned within different cavities in at least one substrate such that the cathode, lasing gaseous volume, and anode are commonly confined within the envelope in an integral relationship and wherein the cathode is a hollow aluminum body shaped to conform to the wall of said cathode cavity and having a slot in one wall thereof connecting to said connecting channel and a laterally extending spade electrically conducting tab extending between said mating surfaces.

2. A gaseous laser envelope, comprising cathode region, laser bore region, and anode region, the improvement wherein all of these regions are defined by
    a single, essentially flat top plate, at least one flat interior plate volumetric space for each of said regions being within said flat interior plate and a single essentially flat bottom plate.

* * * * *